J. J. ROGERS AND P. J. COSGROVE.
CURRYCOMB.
APPLICATION FILED JULY 29, 1918.
1,307,702. Patented June 24, 1919.
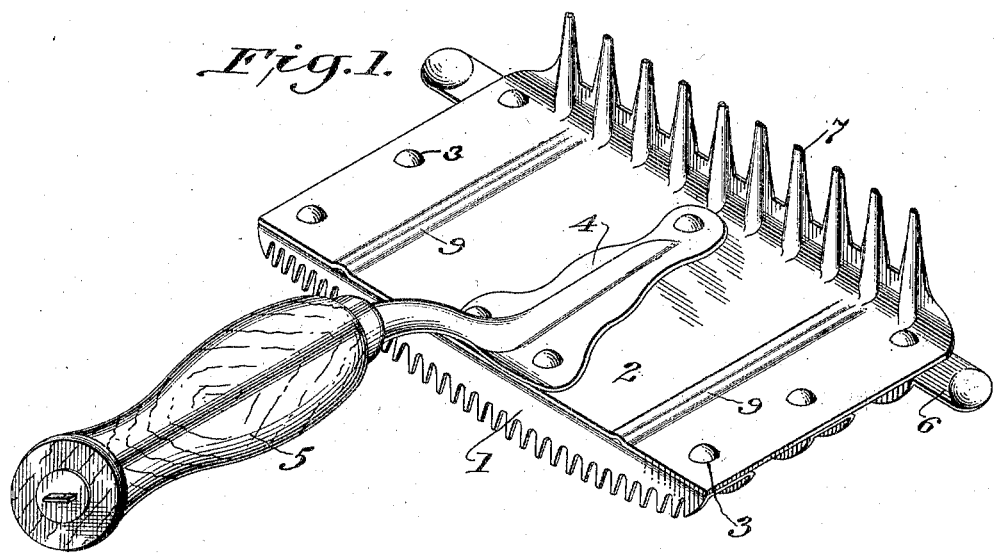
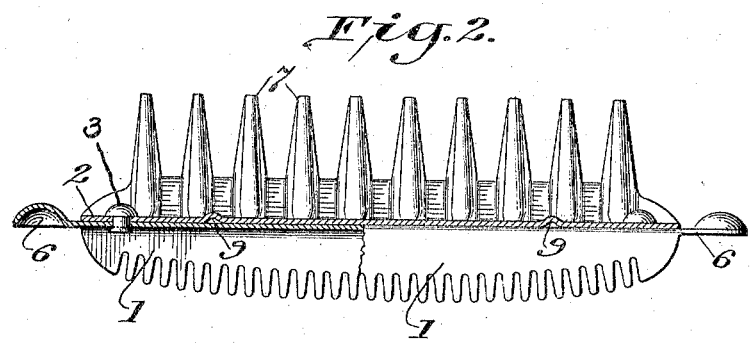
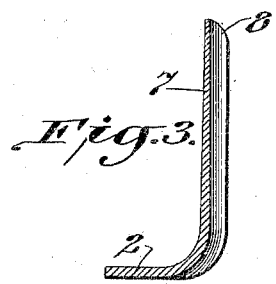
Inventors
Joseph J. Rogers
Patrick J. Cosgrove
by Wm N. Finnell
Attorney

UNITED STATES PATENT OFFICE.

JOSEPH J. ROGERS AND PATRICK J. COSGROVE, OF BROOKLYN, NEW YORK, ASSIGNORS TO NEW YORK STAMPING COMPANY, OF BROOKLYN, NEW YORK, A CORPORATION OF NEW YORK.

CURRYCOMB.

1,307,702.  Specification of Letters Patent.  Patented June 24, 1919.

Application filed July 29, 1918. Serial No. 247,189.

*To all whom it may concern:*

Be it known that we, JOSEPH J. ROGERS and PATRICK J. COSGROVE, citizens of the United States, residing at Brooklyn, in the county of Kings and State of New York, have invented a certain new and useful Improvement in Currycombs, of which the following is a full, clear, and exact description.

This invention relates to that class of curry combs commonly known as curry and mane combs combined, in which teeth are provided for currying the body and limbs of an animal and other teeth are provided for currying or combing the mane.

So far as we are aware, the prior art curry combs of this type have had the mane comb made as a separate structure applied to the back of the curry comb by riveting or otherwise. This separate formation and application of the mane comb involves a series of operations both in production and assembling that add considerably to the cost of the curry combs. In order to reduce this cost, without sacrificing any of the advantages of such combined curry combs, we form the mane comb in one integral piece with the back of the curry comb.

As heretofore constructed, the teeth of the mane comb have been flat, and they tend to tear out the hairs of the mane and otherwise render the combing of the mane difficult; and in order to overcome these disadvantages the teeth of the mane comb are made concavo-convex in cross-section and with their points rounded, thereby decreasing the resistance of the teeth in drawing the comb through the mane.

In the accompanying drawings illustrating the invention, in the several figures of which like parts are similarly designated, Figure 1 is a perspective view. Fig. 2 is a transverse section taken in the rear of the mane comb. Fig. 3 is a longitudinal section of one of the teeth of the mane comb, and Fig. 4 is a transverse section of said tooth, these two views being greatly enlarged.

The series of body combs or toothed members 1 may be of any usual construction and applied to the bottom of the back 2 by means of rivets 3 or otherwise; and this back may be provided with a handle-tang member or tongue 4, riveted or otherwise fixed to the back, and this tang member is supplied with a handle 5 in any usual way.

One of the toothed members may be provided with integral or other knocker elements 6.

The back 2 has its front end provided with teeth 7 standing up therefrom on top of the back, or on the side opposite the members 1, substantially at right angles and preferably, as shown, made integral with the back; and in order to permit the teeth to pass through the hairs of the mane without tearing the mane, said teeth have rounded active faces or are made concavo-convex in cross-section, and the points 8 are curved, rounded, or smoothed down so as to afford the least possible resistance in going through the mane, but without in any wise impairing the efficiency of the teeth as a comb. These mane teeth taper upwardly in the preferred construction. As shown the entire front end of the back containing the mane teeth is turned up bodily substantially at right angles to the back, and the mane teeth are given their concavo-convex form by embossing them longitudinally, and such embossing serves also to strengthen or reinforce the teeth, the convex side facing the direction of movement of the curry comb when in use.

As will be seen, the making of the mane teeth concavo-convex in cross-section will increase the rigidity or stiffness of the teeth.

The back may be provided with any number of longitudinal ribs 9 to reinforce or stiffen the same.

While we prefer to make the mane teeth in one integral piece with the back, still it is obvious that the mane curry comb member with the teeth of the peculiar construction herein set forth, may be applied to a curry comb otherwise than as an integral part of its back. These and other variations in the details of construction are considered to be within the scope of the claims herein made.

It may be said that when as in the prior art the mane comb is made separate from the curry comb itself, there are four operations involved, namely, 1, the blanking out of the mane comb; 2, the piercing of the mane comb for fastening it to the body of the curry comb; 3, the formation of the mane comb so as to make it ready to be placed on the curry comb, and 4, the placing of the mane comb on the curry comb. By making the mane comb of one integral piece with the back of the curry comb there is a considerable reduction in the cost of manufacture; and the making of the teeth of the mane comb in the concavo-convex and rounded form obviates the tearing of the mane such as follows the use of the prior art flat teeth.

What we claim is:—

1. A curry comb having teeth for combing the mane arranged at the front of the comb, said teeth being concavo-convex in cross-section and having their leading ends curved or rounded.

2. A combined body and mane curry comb, having a back, and teeth for combing the mane arranged at the front end of the back and in one integral piece therewith and of concavo-convex cross-section and having their leading ends rounded.

In testimony whereof we have hereunto set our hands this 25th day of July, A. D. 1918.

JOSEPH J. ROGERS.
PATRICK J. COSGROVE.

Witnesses:
T. B. Easby,
E. Schreiner.

Copies of this patent may be obtained for five cents each, by addressing the "Commissioner of Patents, Washington, D. C."